United States Patent
Kim et al.

(10) Patent No.: US 12,241,182 B2
(45) Date of Patent: *Mar. 4, 2025

(54) LEATHER FIBER FOR THE LEATHER SPUN YARN HAVING IMPROVED PROPERTY

(71) Applicant: ATKO PLANNING INC., Paju-si (KR)

(72) Inventors: Ji Eon Kim, Seoul (KR); Bong Jin Choi, Gwangju-si (KR)

(73) Assignee: ATKO PLANNING INC., Paju-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/619,226

(22) PCT Filed: Dec. 1, 2021

(86) PCT No.: PCT/KR2021/018029
§ 371 (c)(1),
(2) Date: Dec. 14, 2021

(87) PCT Pub. No.: WO2023/027259
PCT Pub. Date: Mar. 2, 2023

(65) Prior Publication Data
US 2024/0183084 A1 Jun. 6, 2024

(30) Foreign Application Priority Data
Aug. 26, 2021 (KR) .................. 10-2021-0113047

(51) Int. Cl.
*D02G 3/04* (2006.01)
*D02G 3/10* (2006.01)

(52) U.S. Cl.
CPC ............. *D02G 3/04* (2013.01); *D02G 3/10* (2013.01); *D10B 2201/02* (2013.01); *D10B 2211/02* (2013.01); *D10B 2211/20* (2013.01)

(58) Field of Classification Search
CPC .................. D02G 3/04; D02G 3/10
See application file for complete search history.

(56) References Cited

U.S. PATENT DOCUMENTS

| | | | |
|---|---|---|---|
| 2008/0072628 A1 | 3/2008 | Liu | |
| 2023/0193523 A1* | 6/2023 | Kim | D02G 3/10 66/202 |

(Continued)

FOREIGN PATENT DOCUMENTS

| | | |
|---|---|---|
| CN | 1644778 A | 7/2005 |
| KR | 100765549 | 10/2007 |

(Continued)

OTHER PUBLICATIONS

International Search Report—PCT/KR2021/018029 dated May 20, 2022.

(Continued)

*Primary Examiner* — Shaun R Hurley
(74) *Attorney, Agent, or Firm* — Sughrue Mion, PLLC

(57) ABSTRACT

Provided is a leather fiber for leather spun yarn with improved physical properties of the leather spun yarn by containing leather fibers with more improved length, thickness, fineness. The leather fiber has an average length of 15 mm or more and 40% or more of the content of fibers of more than 15 mm, in the leather fibers for the leather spun yarn contained in the leather spun yarn formed by containing the leather fibers and natural fibers or/and regenerated fibers.

8 Claims, 3 Drawing Sheets

(56) References Cited

U.S. PATENT DOCUMENTS

2024/0183085 A1\* 6/2024 Kim .................. D02G 3/10
2024/0183086 A1\* 6/2024 Kim .................. D02G 3/10

FOREIGN PATENT DOCUMENTS

| KR | 101752176 | 7/2017 | | |
|----|-----------|--------|---|---|
| KR | 101804099 | 12/2017 | | |
| KR | 20180118386 | 10/2018 | | |
| KR | 102034218 | 10/2019 | | |
| KR | 102282044 | 7/2021 | | |
| KR | 20210091042 | 7/2021 | | |
| WO | WO-2019157866 A1 \* | 8/2019 | .............. | D02G 3/04 |

OTHER PUBLICATIONS

European Search Report—European Application No. 21820079.8 issued on Nov. 21, 2023, citing CN 1644778 A and US 2008/0072628.

\* cited by examiner

LEATHER FIBER FOR THE LEATHER SPUN YARN HAVING IMPROVED PROPERTY

TECHNICAL FIELD

The present invention relates to a leather fiber for manufacturing leather spun yarn with improved physical properties, and more particularly, to a leather fiber for leather spun yarn with improved physical properties by containing leather fibers with more improved length, thickness, strength, fineness, and the like than the conventional leather fibers as the leather fibers contained in the leather spun yarn.

BACKGROUND ART

Natural leather as a tough shell wrapping the animal's body is widely used in various fields such as bags, shoes and furniture with excellent physical properties. The natural leather is made into products through chemical and physical processing processes after being separated from the animal's body, and a cutting process according to a design of a desired product among several processes is required. However, a large amount of leather waste is generated through the cutting process, and most of the leather waste is incinerated and buried, and as a result, environmental problems are seriously emerging. Therefore, various research and development related to a recycling method of the leather waste is required.

As a conventional method using leather waste, like Korean Patent Registration No. 765549 and Korean Patent Publication No. 2018-0118386, a method of using a shaving scrap generated in a leather manufacturing process as a spinning material or manufacturing a web-shaped regenerated leather sheet using a shaving scrap, has been mainly used.

The conventional technique is to use a shaving scrap generated in the leather manufacturing process and is a technique using process byproducts that are generated in an early step of forming raw hide and skin to leather, not a method of using flat/flaked leather waste discharged as cutting waste that is substantially generated by a cutting process.

In addition, in Korea Registration Patent No. 2034218, there is disclosed spun leather yarn including leather fibers manufactured by carding blended fibers made by blending leather fibers, general fibers and polymer fibers to produce a sliver and twisting and drafting the sliver.

However, the conventional leather fiber has a problem that it is difficult to be manufactured to leather spun yarn due to an average of about 10 mm in length, and the physical properties such as tensile strength are not high due to the short length of the leather fiber.

Accordingly, the present inventors developed a leather fiber capable of manufacturing leather spun yarn from leather waste to manufacture fabrics, knits, and laces including the property of leather, found that the leather fibers were produced without being affected by the season by replacing a leather material used for existing bags, running shoes, and the like to manufacture high-quality leather spun yarn including warmth and general flame resistance of natural leather, and then completed the present invention.

DISCLOSURE

Technical Problem

The present invention is invented to solve the problems in the related art and an object of the present invention is to provide a leather fiber capable of manufacturing leather spun yarn with improved physical properties by containing leather fibers longer than conventional leather fiber by improving the length, thickness, strength, fineness, and the like of the leather fibers contained in the leather spun yarn together with natural fibers and/or regenerated fibers.

Further, an object of the present invention is to provide a leather fiber capable of manufacturing leather spun yarn with improved physical properties capable of adjusting the thickness due to an excellent length/thickness ratio of the leather fibers contained in the leather spun yarn.

Technical Solution

The present invention provides a leather fiber for leather spun yarn with improved physical properties, in which the leather fiber has an average length of 15 mm or more and 40% or more of the content of fibers of more than 15 mm, in the leather fibers for the leather spun yarn contained in the leather spun yarn formed by containing the leather fibers and natural fibers or/and regenerated fibers.

The leather fiber may have an average thickness of 0.05 to 0.15 mm.

The leather fiber may have a length/thickness ratio of average 130 or more.

The leather fiber may have 15% or more of the content of fibers having the length/thickness ratio of more than 200.

The leather spun yarn may contain 10 wt % or more of the leather fibers.

The natural fibers may be any one or two or more of cotton fibers, wool fibers, and silk fibers, and the regenerated fibers may be rayon fibers or acetate fibers.

The leather spun yarn may contain 10 wt % or more of the leather fibers.

Further, the present invention provides a leather product including the leather fibers for the leather spun yarn.

Advantageous Effects

According to the present invention, the leather spun yarn with improved physical properties has an effect of improving physical properties such as tensile strength and the like by improving the length of the leather fibers contained the leather spun yarn to contain leather fibers longer than conventional leather fibers together with the natural fibers or/and the regenerated fibers.

Further, there is an effect of adjusting the thickness due to an excellent length/thickness ratio of the leather fiber contained in the leather spun yarn.

Further, since wasted leather may be used as leather fiber after the leather fiber used in the present invention is cut, there is a beneficial effect on an environment.

BEST MODE

Figure 1:
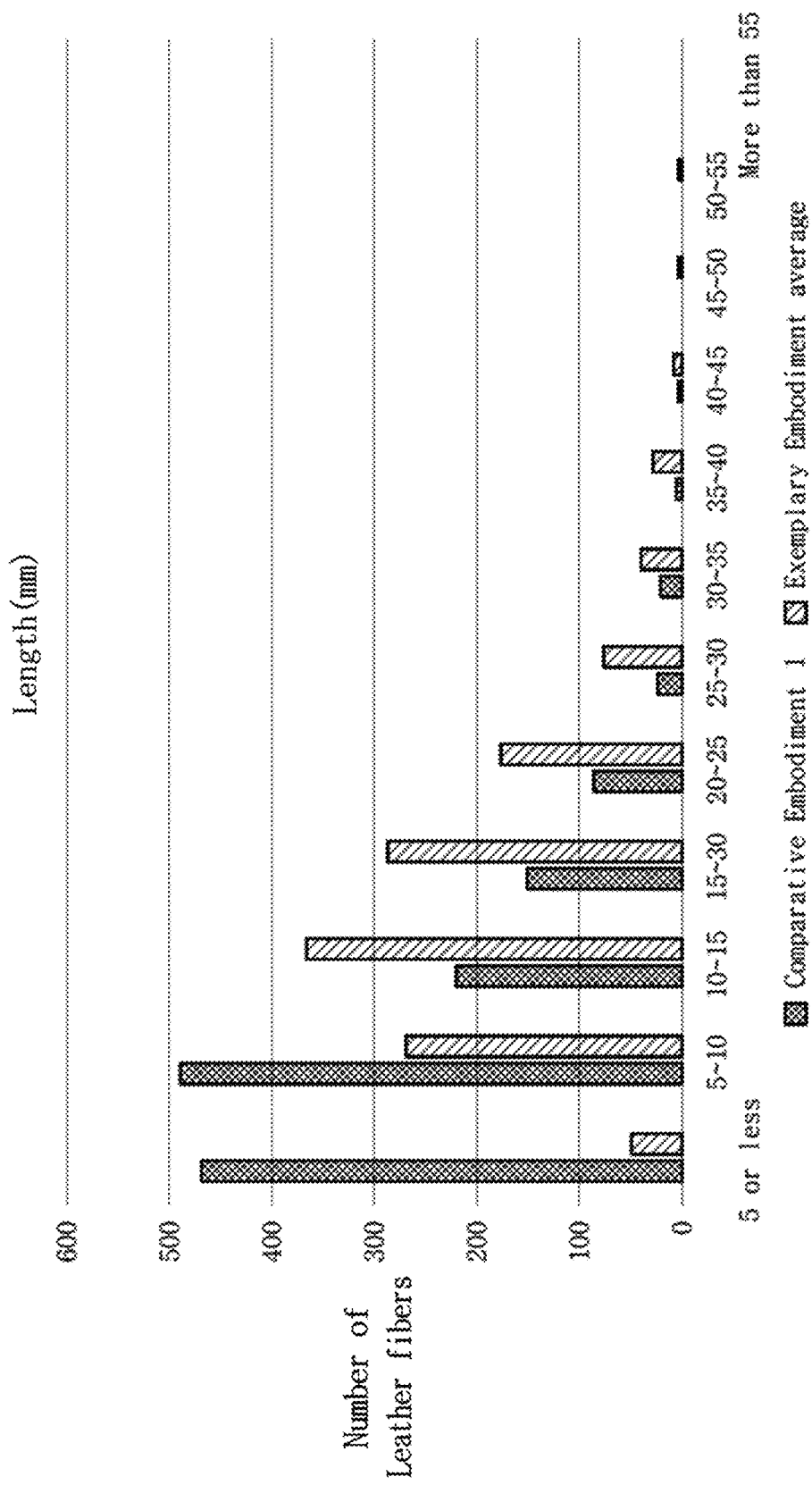
FIG. 1 is a diagram illustrating a length distribution of leather fibers according to the present invention.

Hereinafter, a preferred exemplary embodiment of the present invention will be described in detail with reference to the accompanying drawings. First, among drawings, it should be noted that like constituent elements or components are represented by like reference numerals. In describing the present invention, a detailed description of known functions and configurations incorporated will be omitted so as to avoid obscuring the gist of the present invention.

The terms "about", "substantially", and the like used herein are used as a numerical value or a value close to the numerical value when inherent manufacturing and material tolerances are presented in the stated meaning, and used to prevent an unscrupulous infringer from unfairly using disclosed contents in which precise or absolute numerical values are mentioned to help in the understanding of the present invention.

The 'leather fiber' in the leather fiber for leather spun yarn of the present invention means a set of leather fibers contained in the leather spun yarn.

In the present invention, when the numerical range is described in the range of 'X to Y(Y>X)', unless the limited words such as less than, or less, or more, more than, and the like after X and Y are disclosed, it is defined as 'more than X and Y or less'.

In addition, in the present invention, when the content of fibers is shown as '%', unless the limited words such as 'weight', 'volume', and the like are disclosed, it means a content ratio according to the total number of fibers.

The present invention relates to leather spun yarn containing natural fibers or/and regenerated fibers, in which the leather fiber contained in the leather spun yarn has an average length of 15 mm or more and 40% or more of the content of fibers of more than 15 mm.

Generally, in the spun yarn, it is prevented threads from being released with frictional force between the fibers to maintain a state of the threads, and as the length of the fibers contained is increased, the frictional force is increased, and the strength is improved.

The average length of the leather fibers contained in the leather spun yarn of the present invention is 15 mm or more to improve the frictional force between the leather fibers contained in the leather spun yarn.

Further, since the leather fiber contained in the leather spun yarn of the present invention has 40% or more of the content of leather fibers of more than 15 mm, a large amount of longer leather fibers is contained to further improve the frictional force between the fibers.

Further, the leather fiber contained in the leather spun yarn of the present invention has an average thickness of 0.05 to 0.15 mm and a length/thickness ratio is average 130 or more.

When the thickness of the leather fiber is too thick, it is difficult to adjust the thickness of the leather spun yarn and the texture of the leather spun yarn may deteriorate, and when the thickness of the leather fiber is too thin, the processability may deteriorate. Accordingly, it is preferred that the leather fiber contained in the leather spun yarn has the average thickness of 0.05 to 0.15 mm.

Further, as the length/thickness ratio of the leather fiber contained in the leather spun yarn is increased, the fiber refers to a long and thin leather fiber, the processability is improved, and it is easy to adjust the thickness of the leather spun yarn. Accordingly, it is preferred that the length/thickness ratio of the leather fiber is average 130 or more.

In the leather fiber contained in the leather spun yarn of the present invention, in order to improve the facilitation of adjusting the thickness of the leather spun yarn and the physical properties, it is preferred that the content of fibers having the length/thickness ratio of more than 200 is 15% or more.

As the content of leather fibers having the length/thickness ratio of more than 200 is increased, it is meant that a large amount of long and thin leather fibers is contained, the processability is improved, and the physical properties are improved.

The leather fibers used in the present invention are obtained from the leather, and the leather has a constant length as a flaked/flat scrap to enable the extraction of fiber form.

In the method of obtaining the leather fiber, the leather is crushed by a leather waste treating apparatus of Korean Patent Registration No. 1804099 to break the binding force between the fibers and then the crushed leather may be separated and obtained into leather fibers through a separation process.

In the leather fibers of the present invention, in order to obtain the long leather fibers, it is preferred to obtain leather fibers using a scrap having a length of one surface of about 100 mm or more and an area of 50 to 250 cm$^2$.

The separation process separates the leather fibers and separates uniform leather fibers to improve the physical properties of the leather spun yarn and the uniformity ratio in a leather product including the leather spun yarn.

Since in the micronized leather formed by the leather waste treating apparatus, powder-like leather and irregular leather fibers having the thickness of several μm to hundreds μm are mixed, they need to separate leather fibers having uniform length and thickness through the separation process.

The separation process is a process of separating leather fibers through air pressure to apply the air pressure to the leather fibers and separate the leather fibers through a moving distance of the leather fiber due to the air pressure.

The separation process may be performed by separating the leather fibers by moving the leather fibers vertically or horizontally to the ground through the air pressure and obtaining the leather fibers lifted at a constant height by moving the leather fibers vertically.

The air pressure of the separation process is preferably 4 to 10 bar, more preferably 5 to 8 bar.

As the number of times of the separation process is increased, it is possible to classify the uniform thickness and length of the fibers, but the separation process is performed preferably 2 to 8 times, more preferably 3 to 5 times for process efficiency.

As an example of the separation process, the separation process may be performed by lifting leather fibers at air pressure of 4 to 10 bar on a pipe formed vertically to the ground and then obtaining the leather fibers lifted to 1 to 4 m.

In the present invention, the leather fibers may be obtained by a method of suctioning the lifted and separated leather fibers by a suction device of 2 to 8 bar to obtain thin and long leather fibers.

The leather that may be used in the present invention may use various leather such as cow leather, sheep leather, pig leather, and the like, but the sheep leather or the pig leather is thinner than the cow leather and has low strength to form too short leather fibers, and thus, it is difficult to be manufactured as spun yarn. Accordingly, it is preferred to extract the leather fibers from the cow leather.

The natural fibers contained in the leather spun yarn together with the leather fibers may use cotton fibers, wool fibers, silk fibers, and the like, and may use various natural fibers according to the usage and the purpose, and may be used with one or two or more natural fibers.

Further, the regenerated fibers may use rayon fibers, acetate fibers, and the like, and may be various natural fibers according to the usage and the purpose, and may be used with one or two or more regenerated fibers.

The leather fibers contained in the leather spun yarn are preferably contained in 10 wt % or more, and when the leather fibers are contained in less than 10 wt %, sensibility such as leather-specific texture may deteriorate.

The leather spun yarn of the present invention may be manufactured using leather fibers and natural fibers or/and regenerated fibers by using a carding machine, a drawing frame, a fly frame, and a spinning machine, and may be manufactured by a general spun yarn manufacturing process.

As described above, the leather spun yarn with improved physical properties of the present invention containing the long leather fibers may be used for various leather products due to the improved physical properties.

Hereinafter, as Exemplary Embodiments according to the present invention, leather fibers for leather spun yarn with improved physical properties and leather spun yarn were manufactured. The present invention is not limited to these Exemplary Embodiments.

Exemplary Embodiment 1

A cow leather scrap was micronized using a leather waste treating apparatus and then each leather fiber was obtained by a separation process.

The cow leather scrap used a scrap having one surface of 100 mm or more and an area of about 50 to 200 cm$^2$.

The separation process was performed total twice by lifting the leather fibers at air pressure of about 6 bar in a pipe formed vertically to the ground and then suctioning the leather fibers lifted to about 1.8 m or more by a suction device of about 4 bar to obtain the leather fibers to obtain the leather fibers.

The obtained leather fibers and cotton fibers were blended at a weight ratio of 32:68 to manufacture the leather spun yarn of 600 deniers (Nm 15).

Exemplary Embodiment 2

Exemplary Embodiment 2 was manufactured in the same manner as Exemplary Embodiment 1, but in the separation process, the leather fibers were lifted at air pressure of about 7 bar and then the leather fibers lifted to about 2 m or more were suctioned by a suction device of about 4.5 bar to obtain the leather spun yarn with the leather fibers and wool fibers.

Exemplary Embodiment 3

Exemplary Embodiment 3 was manufactured in the same manner as Exemplary Embodiment 1, but in the separation process, the leather fibers were lifted at air pressure of about 8 bar and then the leather fibers lifted to about 2.2 m or more were suctioned by a suction device of about 4.5 bar to obtain the leather spun yarn with the leather fibers and rayon fibers having the fineness of 2 deniers and a fiber length of 38 mm.

Comparative Embodiment 1

Comparative Embodiment 1 was manufactured in the same manner as Exemplary Embodiment 1, but in the separation process, the leather fibers were lifted at air pressure of about 5 bar and then the leather fibers lifted to about 2 m or more were obtained to manufacture the leather spun yarn.

Comparative Embodiment 2

Comparative Embodiment 2 was manufactured in the same manner as Comparative Embodiment 1, but leather spun yarn was manufactured with leather fibers and rayon fibers having the fineness of 2 deniers and a fiber length of 38 mm. 1.5 g of the leather fibers obtained in Exemplary Embodiments 1 to 3 and Comparative Embodiment 1 were taken and the number of leather fibers contained in 1.5 g and the length and the thickness of each leather fiber were measured. Table 1 illustrated lengths, Table 2 illustrated thicknesses, and Table 3 illustrated length/thickness ratios.

TABLE 1

| Length (mm) | Comparative Embodiment 1 | Exemplary Embodiment 1 | Exemplary Embodiment 2 | Exemplary Embodiment 3 | Exemplary Embodiment average |
|---|---|---|---|---|---|
| 5 or less | 469 | 76 | 32 | 39 | 49 |
| 5~10 | 489 | 249 | 237 | 322 | 269.33 |
| 10~15 | 221 | 358 | 341 | 402 | 367 |
| 15~20 | 152 | 265 | 305 | 293 | 287.67 |
| 20~25 | 86 | 171 | 140 | 221 | 177.33 |
| 25~30 | 25 | 59 | 113 | 59 | 77 |
| 30~35 | 23 | 13 | 58 | 51 | 40.67 |
| 35~40 | 6 | 51 | 19 | 14 | 28 |
| 40~45 | 3 | 17 | 5 | 3 | 8.33 |
| 45~50 | 0 | 1 | 5 | 3 | 3 |
| 50~55 | 1 | 2 | 6 | 0 | 2.67 |
| More than 55 | 0 | 2 | 2 | 1 | 1.67 |
| Total number of fibers | 1475 | 1264 | 1252 | 1408 | 1308 |
| Average | 9.52 | 15.21 | 15.65 | 15.36 | 15.41 |
| Fiber content (%) of more than 15 mm | 20.07 | 45.97 | 52.16 | 45.81 | 47.89 |

FIG. 1 is a graph showing a length distribution of leather fibers according to the present invention. As illustrated in Table 1 and FIG. 1, it can be seen that in the leather fibers according to the present invention, the most leather fibers having the length of 10 to 15 mm are contained and the leather fibers of more than 15 mm are contained in 40% or more. In the leather fibers of Comparative Embodiment 1, it can be seen that the most leather fibers of 5 to 10 mm are contained, many leather fibers of 5 mm or less are also contained, and the leather fibers of more than 15 mm are contained in 20.07%, and thus, there is a large difference from the leather fibers of Exemplary Embodiments.

It can be seen that the leather fibers of the present invention of an average of 15.41 mm are much longer than the leather fibers of Comparative Embodiment of 9.52 mm.

are contained. In the leather fibers of Exemplary Embodiments, it can be seen that the number of leather fibers having the length/thickness ratio of 50 or less is small, the number of leather fibers having the large length/thickness ratio is large, and the content of fibers having the average length/thickness ratio of 130 or more and the length/thickness ratio of more than 200 is 15% or more.

TABLE 2

| Thickness (mm) | Comparative Embodiment 1 | Exemplary Embodiment 1 | Exemplary Embodiment 2 | Exemplary Embodiment 3 | Exemplary Embodiment average |
|---|---|---|---|---|---|
| 0.05 or less | 13 | 2 | 9 | 1 | 4 |
| 0.05~0.1 | 309 | 273 | 323 | 285 | 293.67 |
| 0.10~0.15 | 902 | 785 | 696 | 889 | 790 |
| 0.15~0.2 | 222 | 165 | 182 | 221 | 189.33 |
| 0.20.25 | 28 | 32 | 34 | 9 | 25 |
| 0.25~0.3 | 1 | 7 | 6 | 2 | 5 |
| More than 0.3 | 0 | 0 | 2 | 1 | 1 |
| Total number of fibers | 1475 | 1264 | 1252 | 1408 | 1308 |
| Average | 0.122 | 0.1154 | 0.1205 | 0.124 | 0.12 |

Figure 2:
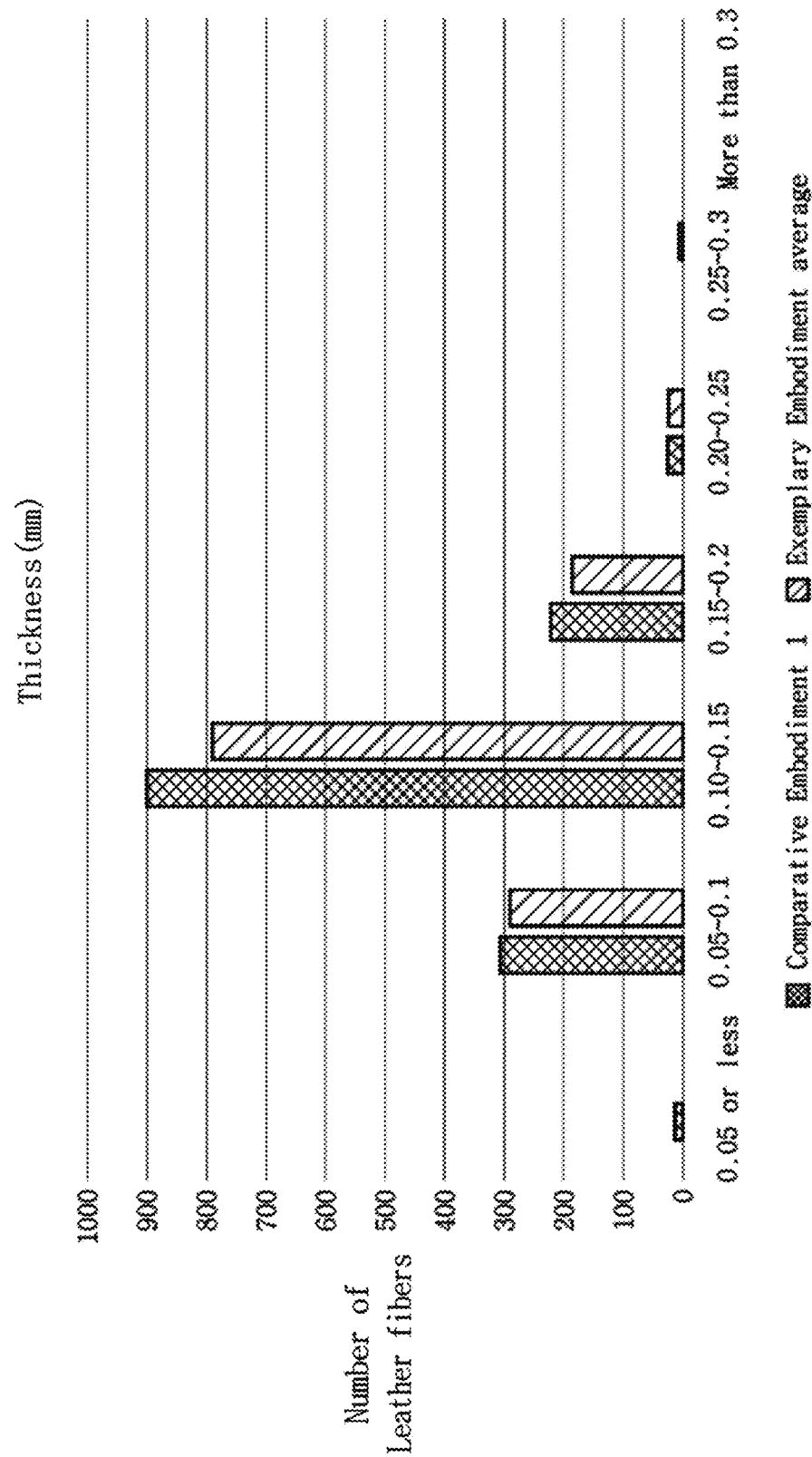
FIG. 2 is a diagram illustrating a thickness distribution of leather fibers according to the present invention.

FIG. 2 is a graph showing a thickness distribution of leather fibers according to the present invention. As illustrated in Table 2 and FIG. 2, it can be seen that in both the leather fibers according to the present invention and the leather fibers of Comparative Embodiment 1, the most leather fibers having the thickness of 0.1 to 0.15 mm are contained and in both Exemplary Embodiments and Comparative Embodiment 1, the leather fibers have an average thickness of about 0.115 to 0.125 mm and have similar thicknesses thereto.

However, in Comparative Embodiment 1, it can be seen that the number of leather fibers having the length/thickness ratio of 50 or less is large, the number of fibers is greatly decreased as the length/thickness ratio is increased, and thus the average length/thickness ratio is 115.05, which are a large difference from Exemplary Embodiments, and the content of fibers having the length/thickness ratio of more than 200 is 13.42%, which is greatly lower than Exemplary Embodiments.

TABLE 3

| Length/thickness ratio | Comparative Embodiment 1 | Exemplary Embodiment 1 | Exemplary Embodiment 2 | Exemplary Embodiment 3 | Exemplary Embodiment average |
|---|---|---|---|---|---|
| 50 or less | 205 | 96 | 89 | 102 | 95.67 |
| 50~100 | 332 | 325 | 342 | 356 | 351 |
| 100~150 | 435 | 406 | 375 | 401 | 394 |
| 150~200 | 305 | 215 | 223 | 258 | 232 |
| 200~250 | 139 | 99 | 162 | 130 | 120.33 |
| 250~300 | 45 | 64 | 35 | 102 | 67 |
| 300~350 | 13 | 29 | 18 | 29 | 25.33 |
| 350~400 | 0 | 18 | 2 | 23 | 14.33 |
| 400~450 | 1 | 4 | 3 | 4 | 3.67 |
| 450~500 | 0 | 6 | 2 | 1 | 3 |
| 500~550 | 0 | 2 | 0 | 1 | 1 |
| More than 550 | 0 | 0 | 1 | 1 | 0.67 |
| Total number of fibers | 1475 | 1264 | 1252 | 1408 | 1308 |
| Average | 115.05 | 140.58 | 132.47 | 135.1 | 136.05 |
| Fiber content (%) of length/thickness ratio of more than 200 | 13.42 | 17.56 | 17.81 | 20.67 | 17.99 |

Figure 3:
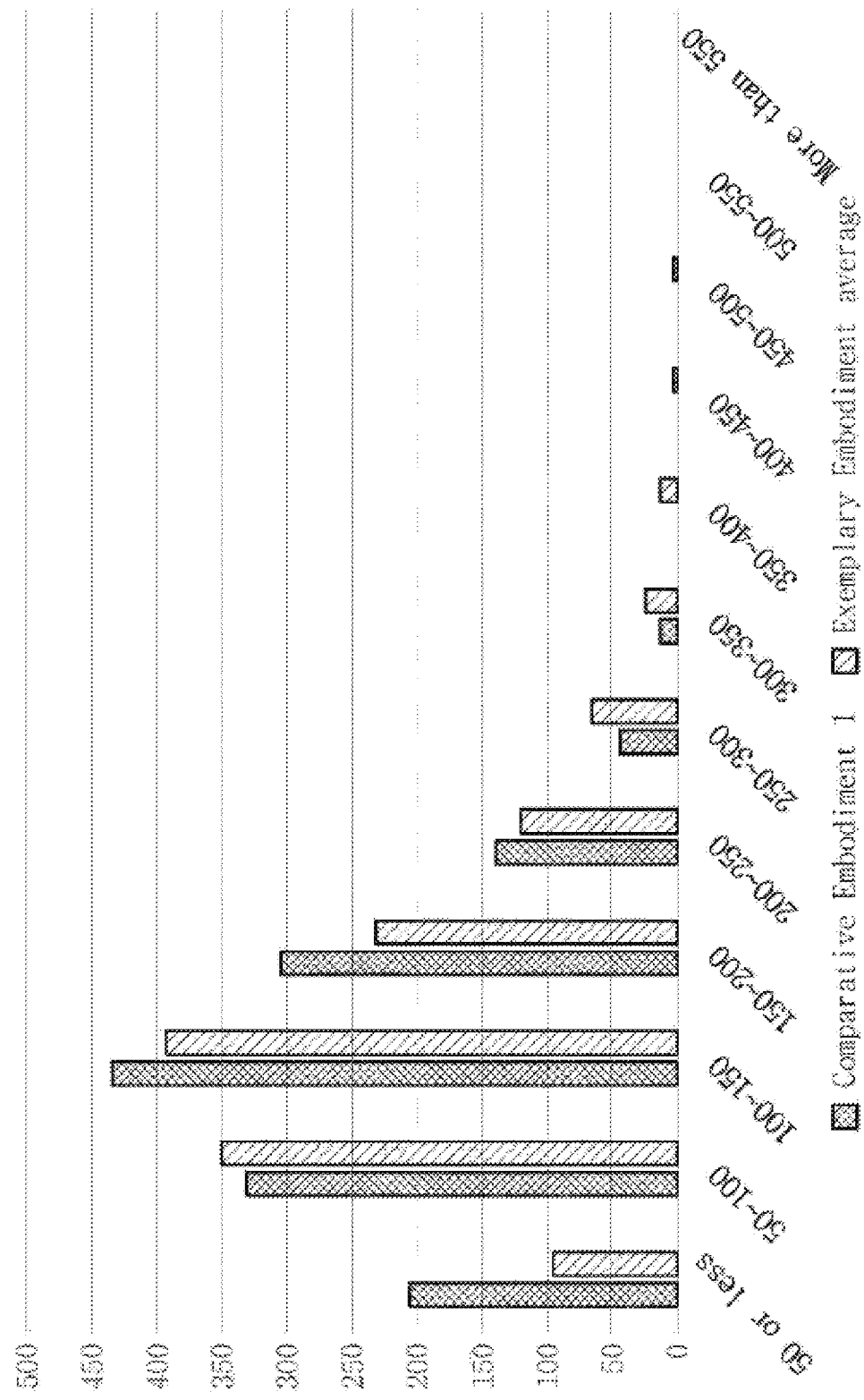
FIG. 3 is a diagram illustrating a length/thickness ratio distribution of leather fibers according to the present invention.

FIG. 3 is a graph showing a length/thickness ratio distribution of leather fibers according to the present invention. As illustrated in Table 3 and FIG. 3, it can be seen that in both the leather fibers according to the present invention and the leather fibers of Comparative Embodiment 1, the most leather fibers having the length/thickness ratio of 150 to 200

Then tensile strengths of the leather spun yarn manufactured in Exemplary Embodiments 1 to 3 and Comparative Embodiments 1 and 2 were measured and illustrated in Table 4.

The tensile strength was measured as the spun yarn strength using a universal testing machine (UTM) of Instron under a measurement temperature of 20° C. and the humidity of 65% according to ASTM D2256 standard.

TABLE 4

| Classification | Comparative Embodiment 1 | Comparative Embodiment 2 | Exemplary Embodiment 1 | Exemplary Embodiment 2 | Exemplary Embodiment 3 |
|---|---|---|---|---|---|
| Tensile strength (g/d) | 0.5 | 0.6 | 1.7 | 1.7 | 1.9 |

As shown in Table 4, it can be seen that the tensile strength with improved physical properties according to the present invention is 1.7 to 1.9 g/d, which is all 1.0 g/d or more, but in Comparative Embodiments 1 and 2, it can be seen that the tensile strengths are 0.5 g/d and 0.6 g/d, which have a large difference from the leather spun yarn of the present invention. It can be seen that in the leather fibers contained in the leather spun yarn of the present invention, many leather fibers having the long length and the large length/thickness ratio exist to increase the frictional force between the fibers forming the leather spun yarn, thereby greatly improving the tensile strength of the leather spun yarn.

The invention claimed is:

1. Leather fibers having an average length of 15 mm or more, and an average thickness of 0.05 to 0.15 mm,
   wherein 40% or more of the leather fibers have a length of 15 mm or more, and
   wherein more than 15% of the leather fibers have a length/thickness ratio of more than 200.

2. The leather fibers as claimed in claim 1, wherein the leather fibers have an average length/thickness ratio of average 130 or more.

3. A leather spun yarn comprising the leather fibers according to claim 1 in an amount of 10 wt % or more relative to an entire leather spun yarn.

4. The leather spun yarn as claimed in claim 3, further comprising:
   natural fibers which are one or more of cotton fibers, wool fibers, and silk fibers, and
   regenerated fibers which are rayon fibers or acetate fibers.

5. A leather product comprising the leather fibers according to claim 1.

6. A leather product comprising the leather fibers according to claim 2.

7. A leather product comprising the leather spun yarn of claim 3.

8. A leather product comprising the leather spun yarn of claim 4.

* * * * *